May 14, 1963 E. JANKUS 3,089,734
FREQUENCY OPERATED BRAKE ANTI-SKID DEVICE
Filed Jan. 23, 1961 2 Sheets-Sheet 1

INVENTOR.
Eugene Jankus.
BY
Harness and Harris
ATTORNEYS

May 14, 1963 E. JANKUS 3,089,734
FREQUENCY OPERATED BRAKE ANTI-SKID DEVICE
Filed Jan. 23, 1961 2 Sheets-Sheet 2

INVENTOR.
Eugene Jankus
BY
Harness and Harris
ATTORNEYS.

3,089,734
FREQUENCY OPERATED BRAKE ANTI-SKID
DEVICE
Eugene Jankus, Detroit, Mich., assignor to Chrysler Corporation, Highland Park, Mich., a corporation of Delaware
Filed Jan. 23, 1961, Ser. No. 84,047
9 Claims. (Cl. 303—86)

This invention concerns improvements in anti-skid devices for vehicles.

Heretofore in anti-skid devices for automotive braking systems it has been customary to use a deceleration sensor to continuously control a valve which reduces the brake pressure when the sensor indicates that the wheels are skidding. The inherent defect of these systems is that each change in deceleration of the wheels must be communicated to the valve from the sensor before the reduction in pressure occurs. This results in a time lag and allows the wheels to alternately roll and skid during the operation of the anti-skid device and thereby increase the stopping distance. Applicant has obviated this time lag and has successfully increased the efficiency of the reduced pressure type anti-skid systems by providing an oscillator as the means to automatically operate the pressure reducing valve mechanism according to a predetermined cycle until the brake pedal is released by the operator.

A principal object of this invention is to provide a relatively inexpensive electrical anti-skid system which practically eliminates the time lag between skid sensing and pressure reducing valve operation.

A further object is to provide an automatically operable anti-skid device which goes into operation at the initial lockup of the braking wheels and continues until the vehicle brake pedal is released.

Further objects and advantages will become apparent from the following description and drawings in which.

Figure 1:
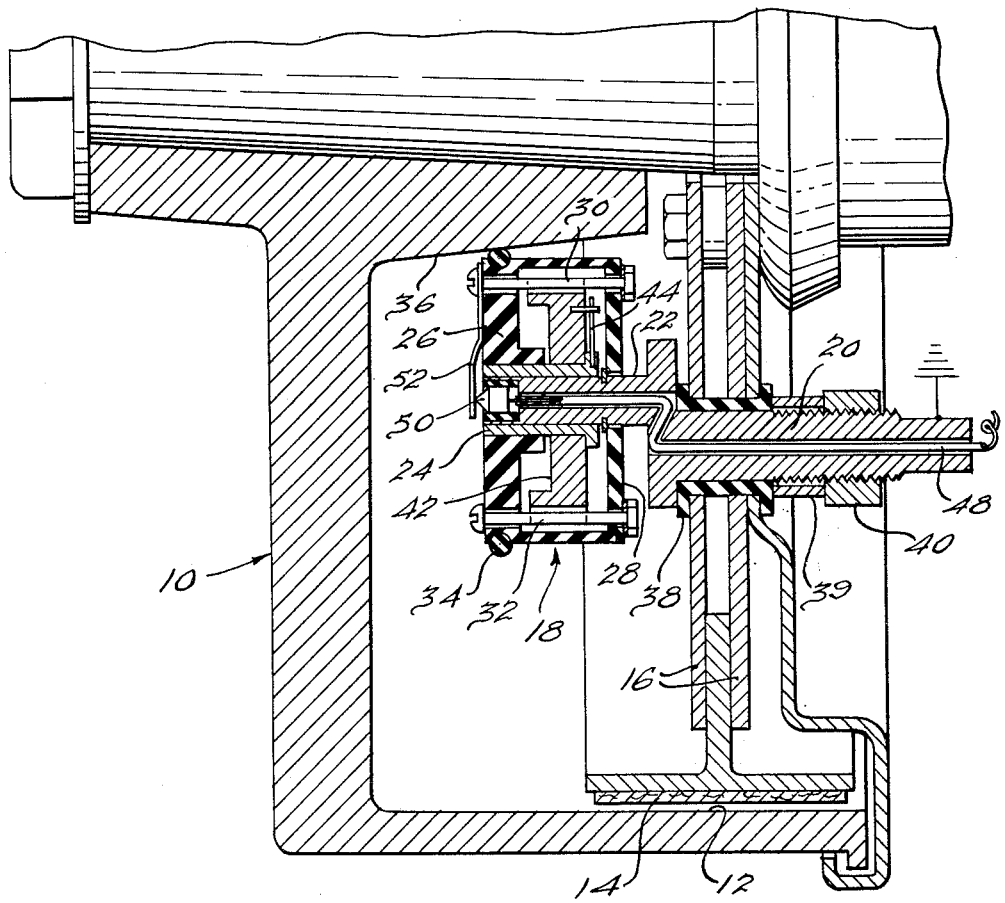
FIGURE 1 represents a cross-sectional view of a brake drum and deceleration sensing device assembly.
Figure 4:
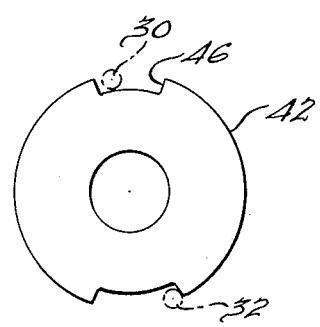
FIGURE 4 represents an end view of the accelerometer flyweight.
Figure 3:
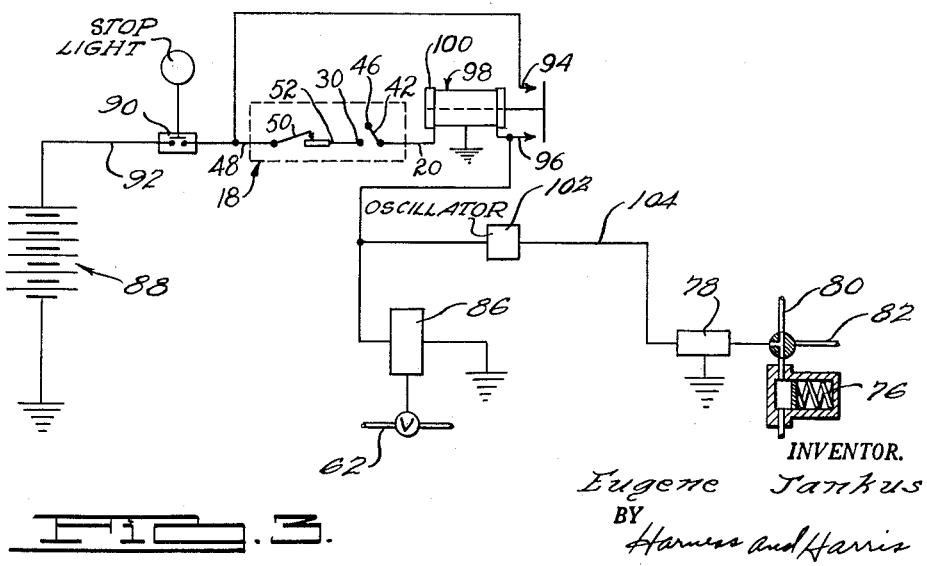
FIGURE 3 represents the electrical system.

Referring to the drawings, a brake drum generally designated 10 provided with a friction face 12 is shown in the assembled position with the brake shoe 14, brake support plates 16 and deceleration sensing device generally designated 18. This sensing device comprises a shaft 20 having an eccentric offset portion 22 upon which is rotatably mounted a plastic non-conducting housing 26 and back plate 28 connected thereto by bolts 30 and 32 and having an Oilite or other type bushing 24 pressed therein. The housing carries a resilient ring 34 preferably of good wearing plastic which is in frictional contact with the hub 36 of the brake drum. Shaft 20 is mounted in the brake support plates 16 by means of an insulative bushing 38 and is locked in place on the plates by spacer 39 and lock nut 40 after the housing 26 has been moved in an eccentric manner into riding contact with the hub 36. An electrically conductive flyweight 42 shown in FIGURES 1 and 4 is rotatably mounted on the bushing 24 and is urged into contact with pre-load screw 32 by means of spring 44 anchored at one end to the bushing 24 and at its other end to the weight 42. Screw 30 acts as a contact screw and when the difference in angular deceleration of housing 26 and weight 42 reaches a predetermined value the force of spring 44 will be overcome and weight 42 will rotate in a counterclockwise direction (FIGURE 4) to contact shoulder 46 with contact screw 30. This contacting will complete the electrical circuit comprising the insulated electrical wire 48, contact tip 50, resilient sliding contact 52, contact screw 30, weight 42, and shaft 20. Wire 48 and shaft 20 are electrically connected in the electrical circuit as shown in FIGURE 3. The greater deceleration of the wheel relative to the flyweight 42 results from a partial loss of friction between the road and the wheel during skidding conditions.

Figure 2:
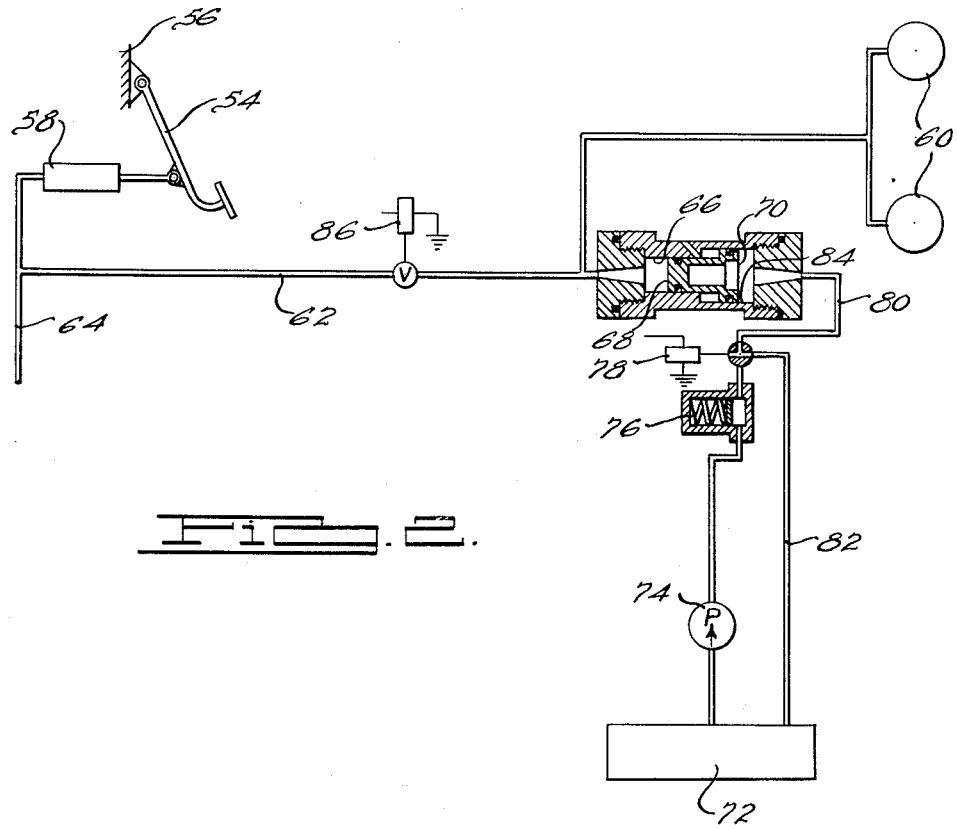
FIGURE 2 represents the hydraulic conduit system.

Referring to FIGURE 2, a brake pedal 54 pivotally mounted to the automotive body 56 is connected to a master hydraulic cylinder 58 in a conventional manner. Master cylinder 58 is then connected to the hydraulic cylinders of brakes 60 which may be rear brakes or front brakes or any combination thereof through conduit 62. If it is desired that only the rear brakes should be connected to the pulsating hydraulic force, a conduit 64 may directly feed the front brakes from the master cylinder 58 in a conventional manner. Conduit 62 is connected to a cylinder 66 communicating with one end of piston 68. The opposite and larger end 70 of this piston is hydraulically connected to a hydraulic fluid reservoir 72, a pump 74, an accumulator 76, and a three-way hydraulic solenoid valve 78. This valve 78 can direct the feed from accumulator 76 to the piston end 70 through conduit 80, or can block the feed from accumulator 76 while connecting conduit 80 to the reservoir 72 to thereby reduce the fluid pressure in conduit 80 and cylinder 84 housing end 70 of the piston. It is obvious that as the pressure in cylinder 84 is reduced and the valve piston moves to the right from its far left or maximum pressure position the hydraulic pressure on the brake 60 will be greatly reduced as the pressure from master cylinder 58 is simultaneously blocked by means of a solenoid locking valve 86 which is actuated to block line 62 simultaneously with the actuation of solenoid 78 to connect return line 82 to line 80.

Referring to FIGURE 3, the electrical system which actuates solenoids 78 and 86 comprises the automotive battery power source 88 connected to the brake stop light switch 90 which will close the circuit and allow current to flow through line 92 up to sensor 18 when the brake pedal 54 is applied. When the electrical contacts 30 and 46 on the accelerometer 18 are made by the predetermined differential deceleration of the housing 26 and weight 42, the coil 100 of the relay 98 is energized and contacts 94 and 96 are closed. The operation of the sensor thereafter has no significance since when contacts 94, 96 close, the coil 100 is permanently energized to maintain contacts 94 and 96 closed until brake pedal 54 is released to break the switch 90.

When contacts 94, 96 close, current is transmitted to an oscillator 102 and to the lock out solenoid 86 described above, and the oscillator 102 then begins to cycle energizing current through line 104 to the three-way valve operating solenoid 78 preferably at about four cycles per second. The oscillator 102 may be of conventional electronic structure or may be mechanical such as a rotating drum switch type. Since valve 78 is connected to the accumulator 76 and return line 82, the cyclicing will alternately apply and release braking pressure on the brakes 60 at the rate of four cycles per second. This cyclicing will continue until the brake pedal is released.

I claim:
1. In a hydraulic braking system for an automotive vehicle having hydraulic cylinder actuated wheel brakes and a manually operable primary pressure developing mechanism operatively connected to the brake cylinders, a secondary hydraulic cylinder, a secondary source of pressure, said secondary cylinder having one side connected to said primary mechanism and the other side to said secondary source of pressure through conduit means, solenoid valve means in said conduit means for dumping the pressure from said secondary source in response to an electrical signal, oscillator means for cycling said electrical signal, accelerometer means operatively connected to said wheels for measuring the deceleration thereof, electrical circuit means electrically connecting said accelerometer means to said oscillator means, and electrical switching means in said circuit means actuated by said accelerometer for completing said circuit means at a predetermined deceleration of said wheels.

2. In a wheeled vehicle hydraulic braking system having manually operable brake actuating means operatively connected to a primary pressure source which in turn is hydraulically connected to hydraulic wheel cylinders, a secondary pressure source, conduit means and first valve means operatively connecting said secondary pressure source to said wheel cylinders, said first valve means being cyclically operable during brake application of said brake actuating means to alternately relieve and apply said secondary source pressure to said cylinders, second valve means to automatically lock off said primary pressure source from said wheel cylinders during cycling connection of said first valve means and secondary pressure source to said wheel cylinders, and electrical circuit means responsive to the rate of deceleration of the vehicle relative to the wheels thereof to control operation of each of said valve means including an oscillator means, a first switch operable by said manually operable brake actuating means arranged in series with an accelerometer switch to control said oscillator for automatically effecting cyclical operation of said first valve means.

3. In a wheeled vehicle hydraulic braking system having manually operable brake actuating means operatively connected to a primary pressure source which in turn is hydraulically connected to hydraulic wheel cylinders, a secondary pressure source, conduit means and first valve means operatively connecting said secondary pressure source to said wheel cylinders, said first valve means being cyclically operable during brake application of said brake actuating means to alternately relieve and apply said secondary source pressure to said cylinders, second valve means to automatically lock off said primary pressure source from said wheel cylinders during cycling connection of said first valve means and secondary pressure source to said wheel cylinders, and electrical circuit means responsive to the rate of deceleration of the vehicle relative to the wheels thereof to control operation of each of said valve means including an oscillator means, a first switch operable by said manually operable brake actuating means arranged in series with an accelerometer switch and a relay mechanism for automatically controlling cyclical operation of said first valve means.

4. In a wheeled vehicle hydraulic braking system having manually operable brake actuating means operatively connected to a primary pressure source which in turn is hydraulically connected to hydraulic wheel cylinders, a secondary pressure source, conduit means and first valve means operatively connecting said secondary pressure source to said wheel cylinders, said first valve means being cyclically operable during brake application of said brake actuating means to alternately relieve and apply said secondary source pressure to said cylinders, second valve means to automatically lock off said primary pressure source from said wheel cylinders during cycling connection of said first valve means and secondary pressure source to said wheel cylinders, and electrical circuit means responsive to the rate of deceleration of the vehicle relative to the wheels thereof to control operation of each of said valve means including an electronic oscillator means, a first switch operable by said manually operable brake actuating means arranged in series with an accelerometer switch and a relay mechanism to automatically control said oscillator for effecting cyclical operation of said first valve means.

5. In a wheeled vehicle hydraulic braking system having manually operable brake-actuating means operatively connected to a primary pressure source which in turn is hydraulically connected to hydraulic wheel cylinders, a secondary pressure source, conduit means and first valve means operatively connecting said secondary pressure source to said wheel cylinders, said first valve means being cyclically operable to alternately relieve and apply said secondary source pressure to said cylinders, second valve means to automatically lock off said primary pressure source from said wheel cylinders during cycling connection of said first valve means and secondary pressure source to said wheel cylinders, and electrical circuit means responsive to the rate of deceleration of the vehicle relative to the wheels thereof to control operation of each of said valve means including a first switch operable by said manually operable brake actuating means arranged in series with an accelerometer switch and a relay mechanism to control a pair of parallel circuits, one of which includes an oscillator for effecting cycling of said first valve means and the other including electrically operable means for effecting opening and closing of said second valve means.

6. In a hydraulic braking system for an automotive vehicle having hydraulic wheel cylinder actuated wheel brakes and a manually operable primary pressure fluid developing mechanism operatively connected to the brake wheel cylinder, a secondary hydraulic cylinder with piston therein, a secondary source of pressure, said secondary cylinder having one side connected to said primary mechanism and the other side to said secondary source of pressure through conduit means, a first valve means in said conduit means for varying the pressure from said secondary source, oscillator means for cycling said first valve means, accelerometer means operatively connected to a wheel for measuring the deceleration thereof, a second valve means to prevent pressurization of the brake cylinder by said primary pressure fluid developing mechanism, electrical circuit means controlled by said accelerometer means to operate said oscillator means, and electrical switching means in said circuit means controlled by said accelerometer for completing said circuit means at a predetermined deceleration of said wheels.

7. In a hydraulic braking system for an automotive vehicle having hydraulic wheel cylinder actuated wheel brakes and a manually operable primary pressure fluid developing mechanism operatively connected to the brake wheel cylinder, a secondary hydraulic cylinder with piston therein, a secondary source of pressure, said secondary cylinder having one side connected to said primary mechanism and the other side to said secondary source of pressure through conduit means, a first valve means in said conduit means for varying the pressure from said secondary source, oscillator means for cycling said first valve means, accelerometer means operatively connected to a wheel for measuring the deceleration thereof, a second valve means to prevent pressurization of the brake cylinder by said primary pressure fluid developing mechanism, electrical circuit means controlled by said accelerometer means to operate said oscillator means and said valve means, and electrical switching means in said circuit means controlled by said accelerometer for completing said circuit means at a predetermined deceleration of said wheels.

8. In a hydraulic braking system for an automotive vehicle having hydraulic wheel cylinder actuated wheel brakes and a manually operable primary pressure fluid developing mechanism operatively connected to the brake wheel cylinder, a secondary hydraulic cylinder with piston therein, a secondary source of pressure, said secondary cylinder having one side connected to said primary mechanism and the other side to said secondary source of pressure through conduit means, a first valve means in said conduit means for varying the pressure from said secondary source, oscillator means for cycling said first valve means, accelerometer means operatively connected to a wheel for measuring the deceleration thereof, a second valve means to prevent pressurization of the brake cylinder by said primary pressure fluid developing mechanism, electrical circuit means controlled by said accelerometer means to operate said oscillator means, and electrical switching means in said circuit means controlled by said accelerometer for completing said circuit means at a predetermined deceleration of said wheels, said electrical circuit means including relay means to operate said first valve means at the cyclicing frequency of the oscillator.

9. In a hydraulic braking system for an automotive vehicle having hydraulic wheel cylinder actuated wheel brakes and a manually operable primary pressure fluid developing mechanism operatively connected to the brake wheel cylinder, a secondary hydraulic cylinder with piston therein, a secondary source of pressure, said secondary cylinder having one side connected to said primary mechanism and the other side to said secondary source of pressure through conduit means, a first valve means in said conduit means for varying the pressure from said secondary source, oscillator means for cycling said first valve means, accelerometer means operatively connected to a wheel for measuring the deceleration thereof, a second valve means to prevent pressurization of the brake cylinder by said primary pressure fluid developing mechanism, electrical circuit means controlled by said accelerometer means to operate said oscillator means, electrical switching means in said circuit means controlled by said accelerometer for completing said circuit means at a predetermined deceleration of said wheels, said electrical circuit means including relay means to operate said first valve means at the cyclicing frequency of the oscillator and relay means to close said second valve means simultaneously with the energization of said oscillator means.

References Cited in the file of this patent

UNITED STATES PATENTS

| | | |
|---|---|---|
| 2,394,343 | Vorech | Feb. 5, 1946 |
| 2,753,017 | Curl et al. | July 3, 1956 |
| 2,826,278 | Highley | Mar. 11, 1958 |
| 2,906,376 | Zeigler | Sept. 29, 1959 |